May 8, 1923.
T. W. ADAIR
1,454,611
COMBINATION DRILL AND TOOL HOLDER
Filed June 30, 1921
2 Sheets-Sheet 1
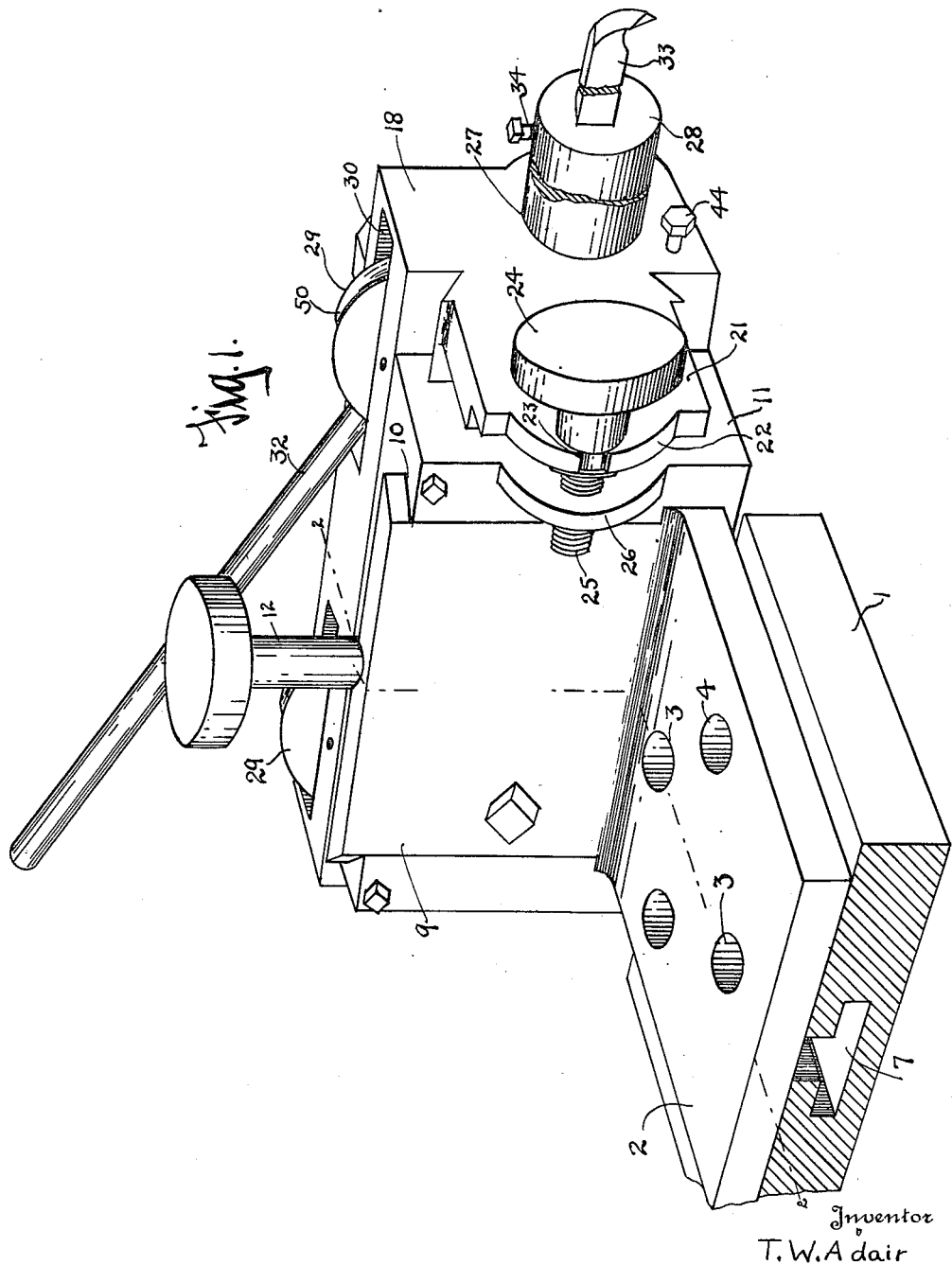
Inventor
T. W. Adair
By Jesse R. Stone
Attorney May 8, 1923.
T. W. ADAIR
1,454,611
COMBINATION DRILL AND TOOL HOLDER
Filed June 30, 1921
2 Sheets-Sheet 2
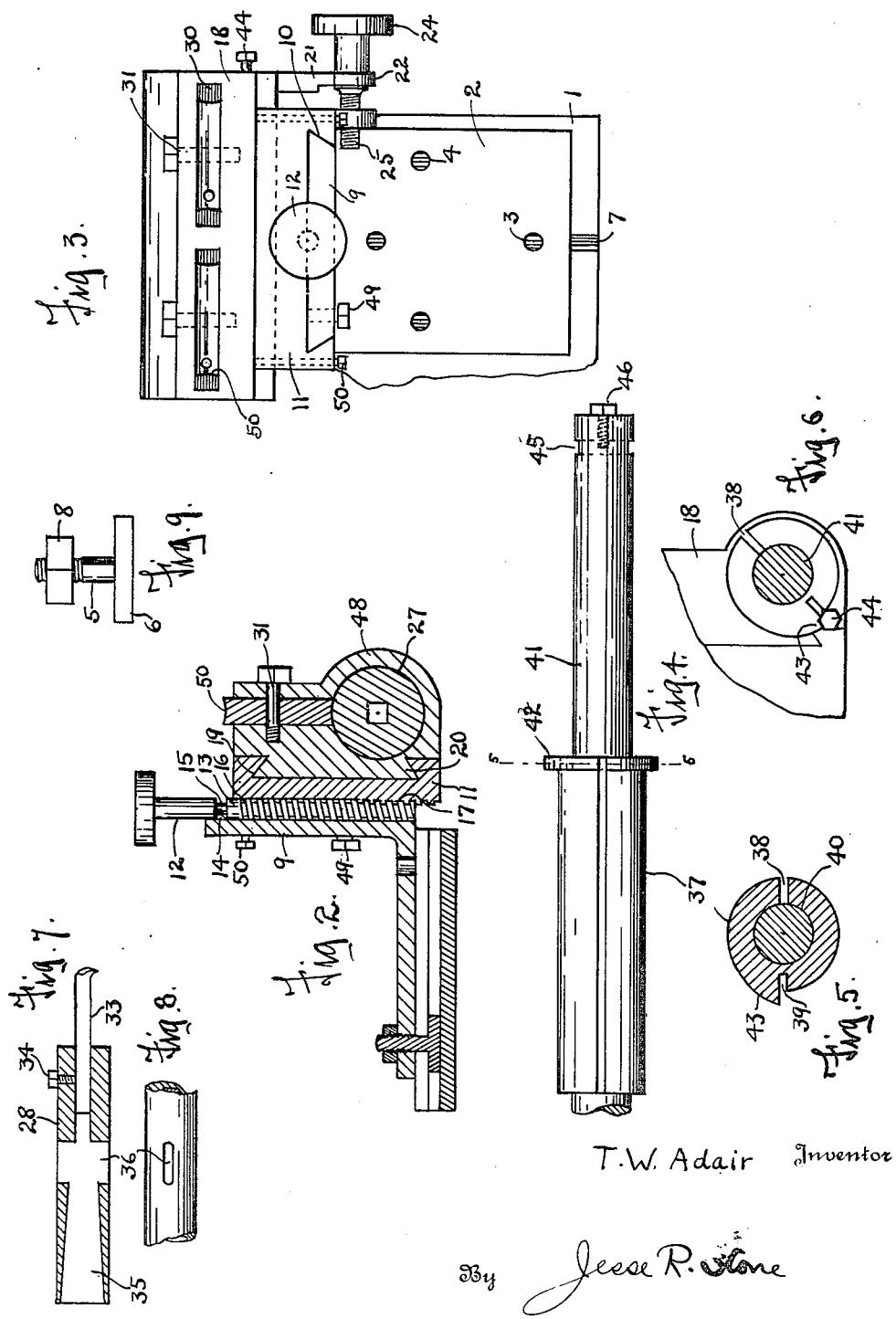
T. W. Adair Inventor
By Jesse R. Stone
Attorney Patented May 8, 1923.

1,454,611

UNITED STATES PATENT OFFICE.

THOMAS W. ADAIR, OF HUMBLE, TEXAS.

COMBINATION DRILL AND TOOL HOLDER.

Application filed June 30, 1921. Serial No. 481,490.

*To all whom it may concern:*

Be it known that I, THOMAS W. ADAIR, a citizen of the United States, residing at Humble, Harris County, Texas, have invented a certain new and useful Improvement in Combination Drill and Tool Holders, of which the following is a full, clear, and exact description, such as will enable others skilled in the art to which it appertains to make and use the same.

My invention relates to combination drill and tool holders for lathes used in metal working. It has particular application to tool holders for boring and drilling operations where exact adjustment of tool relative to the work is necessary.

The object of my invention is to provide a tool holder to be used on the usual tool slide rest of metal working lathes, which will be capable of easy and delicate adjustment, either vertically or horizontally, to position the tool at the exact point desired.

Another object is to provide a means of attachment, in the holder, for tools of different size and shape, which means may be conveniently and quickly operated.

Referring to the drawing in which like parts are referred to by like numerals of reference throughout the several views, Fig. 1 is a perspective view of my improved tool holder. Fig. 2 is a transverse section on a line 2—2 of Fig. 1. Fig. 3 is a top plan view thereof. Fig. 4 is a side elevation of an improved bushing for the purpose of securing in position tools of smaller size. Fig. 5 is a transverse section taken on a line 5—5 of Fig. 4. Fig. 6 is a broken detail showing an end view of the bushing disclosed in Fig. 4 in its position relative to the holder. Fig. 7 is a longitudinal section through my improved holding bar. Fig. 8 is a broken elevation of the same holder. Fig. 9 is a side elevation of a clamping bolt.

The general purpose of my present invention is to provide adjustments in addition to the adjustments which may be found at present on metal working lathes. This adjusting means is to be employed in place of the tool post or clamp now ordinarily used. I contemplate placing my device upon the slide rest now forming a part of the table or compound for supporting the tools relative to the work. In the usual adjustments on the lathes themselves, it is often very difficult to get a means of shifting the position of the tool which will be sufficiently delicate in its operation as to place the tool at the exact point desired. It is now very often necessary, especially in properly positioning a tool for the purpose of cutting internal threads in the work being operated upon, to fit the tool as far as possible by the ordinary lathe adjustments, and then hammer the tool in the clamp to further adjust it to the exact point desired. I have, therefore, a means of adjusting the holding bar, in which the tool is secured both vertically and horizontally with a means which may be manipulated quickly without the use of a wrench.

In Fig. 1 I have shown a general view of my tool holder fitted upon the slide rest or table 1 of the lathe. For the purpose of attaching my device to the slide rest I have provided a laterally extending base or support 2 having a plurality of openings 3 and 4 therein. The openings 3 are shown as two in number and aligned relative to the device so that T-bolts may be inserted through the said openings and thus secure the holder in the position shown in Fig. 1. A T-bolt such as is ordinarily used for this purpose is shown in Fig. 9. The bolt 5 there shown is inserted with the lower head 6 fitting within the T-bolt slot 7 in the table and when the bolts have been secured through the openings 3, the nuts 8 are used to clamp the holder securely to the table. When the holder is to be secured at a position at right angles relative to that shown in the drawing, the T-bolts 5 are inserted through the openings 4 in the base 2 in an obvious manner.

The base 2 is provided at its forward end with a vertical bracket 9. This bracket is tenoned at its side so as to fit within a dovetailed mortice 10 within the block 11 constituting the main body of my holder.

The block 11 may be adjusted vertically relative to the bracket 9 of the support by means of a hand screw 12. As shown particularly in Fig. 2, the bracket 9 is provided centrally with a semi-cylindrical recess, vertically thereof, to receive the threaded lower end 13 of the screw. Adjacent the upper end of this recess there is a projecting tongue 14 adapted to fit within an annular groove 15 in the screw so as to prevent longitudinal movement of the screw relative to the bracket. The block 11 is also provided with a cooperating cylindrical recess 16 to receive the screw 12. This recess 16 is threaded toward the lower end thereof at 17 to engage with the screw 12. It will thus be noted that when the screw 12 is rotated it engages only along the threaded portion 17 of the block 11. This, however, will cause the block 11 to be raised or lowered relative to the screw which is held against vertical movement itself by means of the tongue 14 in the groove 15. It will be seen that the rotation of the screw in the recesses thus formed in the meeting faces of the bracket 9 and the block 11 will adjust the block 11 vertically relative to the supporting bracket 9.

The tool supporting member 18 of my device is mounted slidably upon the block 11. To provide for this longitudinal adjustment of the holder relative to the block 11 there is formed in the inner face of the said block a dove-tailed mortice 19 into which a tenon 20 on the holder is adapted to fit. To provide for the delicate adjustment of the holder longitudinally relative to the block, the forward end of the holder is formed with a laterally extending plate 21 thereon as shown particularly in Figs. 1 and 3. This plate is rounded off at 22 and slotted at 23 to receive the shank of an adjusting screw 24 which is prevented from longitudinal movement relative to the plate by having an annular groove formed adjacent the head thereof, said grooved portion being adapted to fit within the slot 23 as shown. The other end of the screw is threaded at 25 to fit within a threaded opening in a laterally extended plate 26 on the block 10. Thus, by rotating the screw 24, the holder 18 may be moved longitudinally relative to the block 11 in an obvious manner. The threads on the screw 25 are sufficiently fine to provide a very delicate adjustment of the holder relative to the supporting block.

The holding member 18 is formed with a cylindrical opening 27 toward the lower part thereof, the forward side of the holder being rounded at 48 to provide sufficient stock in which to form an opening of some size. This large opening will accommodate the holder to receive various sizes of holding bars. In Fig. 1 I have shown a bar 28 adapted to fit loosely within the said opening.

In order to clamp the holding bar within the opening 27, I have devised a plurality of cam wheels 29. These cams are fitted within slots 30 in the upper face of the holder and are rotatable upon axes 31, placed eccentrically of the cams. The outer periphery of each of the cams is grooved, as shown at 50, to conform to the shape of the outer circumference of the opening 27.

In order to rotate the cam wheels to lock the holding bar securely in the opening 27, I have provided radially directed openings 32 in the periphery of the cams so formed as to receive an operating bar or rod 32. Thus, by placing the operating bar 32 within the opening in the cam and forcibly throwing the cam into locking position, the holding bar 28 will be firmly clamped against movement relative to the holder.

The holding bar 28 is formed, at its forward end, with a squared opening to receive a small cutting tool 33 of ordinary construction, this tool being held in place relative to the bar by means of a set screw 34. As shown in Fig. 7, the opposite end of the holding bar 28 is formed with a tapered recess 35 to receive the shank of an ordinary type of tapered shank boring tool. A transverse slot 36 through the holding bar provides opening for a drift pin in removing the tools.

When it is desired to use boring bars or other tool holders of smaller diameter than the holding bar 28 previously described, I contemplate using a split bushing of the type shown in Figs. 4, 5 and 6. The bushing 37, as shown, is cylindrical in shape, but is split radially at 38 along one side thereof and is also grooved longitudinally at 39 opposite the slot 38 in such manner as to allow a clamping action of the bushing relative to the central longitudinal opening 40 therein. The opening 40 is of a standard size to receive a boring bar 41, such as is shown in Fig. 4. The forward end of the bushing 37 is formed with a radially extending flange 42, the circumference of which is enlarged somewhat at one side to form a stop member 43. This stop member is adapted to rest against a forwardly extending pin 44 on the forward end of the head of the holding block 18. In Fig. 6 I have shown the bushing fitted within the opening 27 of the holder and rotated so that the stop member 43 rests upon the pin 44. In this position, it will force the bushing firmly together in such manner as to clamp the boring bar 41 firmly against movement. The forward end of the boring bar is provided with a diametrically extending opening 45 to receive tools of usual description used in boring and the forward end has a threaded recess for tools or for a set screw 46 to clamp the tools in the opening 45.

In the operation of my device, the tool holder is clamped to the slide rest or table 1 of the lathe in the position relative to the lathe as desired. The holding bar is then clamped in the forward end of the holding member 18 and the cams 29 are rotated into locking position to secure the holding bar firmly in place. The holder is then adjusted relative to the work, which is usually secured in the chuck of the lathe, and when positioned as accurately as possible by means of the lathe adjustments, the further adjustment of the tool is accomplished by means of the adjustments on the tool holder itself. When the tool is to be adjusted vertically, it will only be necessary to rotate the hand screw 12 in the direction to raise or lower the tool as desired. When properly adjusted in this manner the set screw 49 will serve to secure the holder against further movement. If further adjustment of the tool to or from the work is necessary, this may be accomplished by the manipulation of the screw 24 which, as will be obvious, will slide the holder 18 relative to the block 11 in either direction desired. The locking of the holder in lateral adjustment may be accomplished by tightening the set screws 50 if desired.

The use of the holding bars and bushings in the form shown and described is of advantage in that different sizes and shapes of tools may be used to accomplish any of the purposes for which a metal working lathe is desired. Boring, milling, or threading, and like operations may be accomplished, and, by mounting the tools on my improved holder, these operations may be performed with a degree of accuracy and with an ease and facility of operation which cannot be provided in the usual lathe adjustments present on the machines now in ordinary use.

While I have shown and described the preferred embodiment of my invention, I am aware that various changes may be made therein, and I do not wish to be limited to the exact construction disclosed, further than accords with the claims hereto appended.

Having thus described my invention, the objects and advantages of which will be obvious to one skilled in the art without further description, what I claim as new, and desire to protect by Letters Patent is:

1. In a tool holder for lathes, a bracket, a block, means to adjust said block vertically relative to said bracket, comprising a screw fitting in the meeting faces of said bracket and holder and having threaded engagement with said block, means to prevent movement of said screw relative to said bracket, a holder having lateral screw adjustment relative to said block and means to clamp a tool holding bar in said holder.

2. In a tool holder for lathes, a supporting base, a vertical bracket on said base, a block mortised to said bracket and adjustable vertically relative thereto, means to adjust said block comprising a screw rotatable in a cylindrical vertical recess in the meeting faces of said bracket and block, said screw having threaded engagement only with said block, means to prevent movement of said screw relative to said bracket, and a tool holder adjustable longitudinally on said block and having tool clamping means thereon.

3. In a tool holder for lathes, a supporting base, a block adjustable vertically relative to said base, a tool holder adjustable longitudinally on said block, a holder bar, and means thereon to clamp said bar in said tool holder comprising cam wheels whose periphery is grooved to fit against said bar.

4. In a tool holder for lathes, a supporting base, a block adjustable relative to said base, a tool holder adjustable on said block, said holder having a cylindrical opening therein, a holder bar in said recess and means to clamp said bar in place comprising a cam wheel whose periphery is grooved to conform to the curvature of said opening and means to rotate said cam.

5. In a tool holder for lathes, a supporting base, a block adjustable vertically relative thereto, a holder adjustable longitudinally relative to said block, a holder bar and means to clamp said bar in position in said holder.

6. In a tool holder, a supporting base, means to secure said base to the slide rest of a lathe, a vertically arranged bracket on said base, a block adjustable vertically relative to said bracket, a holder adjustable longitudinally of said block, a holding bar on said block and means to clamp said bar in position.

7. In a tool holder for lathes, a base adapted for attachment to a lathe slide rest, a holder having vertical and lateral adjustments relative to said base, said holder having an opening therein, a split bushing adapted to fit in said opening, a boring bar in said bushing, means to register said bushing in said opening, and means to clamp said bushing and said bar in position therein.

8. In a tool holder for lathes, a base adapted for attachment to a lathe slide rest, a holder, having vertical and longitudinal screw-operated adjustments relative to said base, said holder having a cylindrical bar holding opening longitudinally thereof, a bushing on one side and grooved on the opposite side in said opening, a boring bar in said bushing, means to register said bar and bushing properly in said opening, and means to clamp said bushing and said bar simultaneously in said opening.

In testimony whereof, I hereunto affix my signature, this the 25 day of June A. D. 1921.

THOMAS W. ADAIR.